United States Patent
Ripa Schaul

(10) Patent No.: US 11,375,711 B2
(45) Date of Patent: Jul. 5, 2022

(54) METHOD TO MANUFACTURE ANT BAIT MATRICES AND COMPOSITIONS

(71) Applicant: CENTRO DE ENTOMOLOGÍA APLICADA LTDA., Quillota (CL)

(72) Inventor: Renato Ripa Schaul, Quillota (CL)

(73) Assignee: CENTRO DE ENTOMOLOGIA APLICADA LTDA., Quillota (CL)

( * ) Notice: Subject to any disclaimer, the term of this patent is extended or adjusted under 35 U.S.C. 154(b) by 311 days.

(21) Appl. No.: 16/467,931

(22) PCT Filed: Mar. 8, 2017

(86) PCT No.: PCT/IB2017/051368
§ 371 (c)(1),
(2) Date: Jun. 7, 2019

(87) PCT Pub. No.: WO2018/162954
PCT Pub. Date: Sep. 13, 2018

(65) Prior Publication Data
US 2020/0068877 A1  Mar. 5, 2020

(51) Int. Cl.
*A01N 25/00* (2006.01)
*A23L 13/10* (2016.01)
*A23L 13/60* (2016.01)
*A23B 4/01* (2006.01)

(52) U.S. Cl.
CPC .............. *A01N 25/006* (2013.01); *A23B 4/01* (2013.01); *A23L 13/10* (2016.08); *A23L 13/60* (2016.08)

(58) Field of Classification Search
None
See application file for complete search history.

(56) References Cited

U.S. PATENT DOCUMENTS

| | | |
|---|---|---|
| 5,273,761 A | 12/1993 | Kim et al. |
| 5,690,951 A | 11/1997 | Lew et al. |
| 5,850,707 A | 12/1998 | Fell et al. |
| 5,945,271 A | 8/1999 | Cohen |
| 7,045,138 B2 | 5/2006 | Kennedy et al. |
| 8,840,909 B2 | 9/2014 | Taranta et al. |
| 10,334,862 B2 * | 7/2019 | Yoon .................. A23B 4/22 |
| 2005/0153031 A1 * | 7/2005 | Man .................... A23B 4/30 426/332 |
| 2007/0079545 A1 | 4/2007 | McManus et al. |
| 2008/0248167 A1 | 10/2008 | McMindes et al. |
| 2008/0254168 A1 | 10/2008 | Mueller et al. |
| 2010/0028295 A1 * | 2/2010 | Taranta ............... A01N 25/006 424/84 |
| 2012/0017491 A1 * | 1/2012 | Gutsmann ........... A01N 25/006 43/131 |

FOREIGN PATENT DOCUMENTS

| | | |
|---|---|---|
| CA | 1333561 C | 12/1994 |
| CN | 105725091 A | 7/2016 |
| KR | 20150112184 A | 10/2015 |
| WO | WO2010060817 A2 | 6/2010 |
| WO | WO2015081390 A2 | 6/2015 |

OTHER PUBLICATIONS

Kaspari & Yanoviak, 2001. Bait Use in Tropical Litter and Canopy Ants—Evidence of Differences in Nutrient Limitation 1. Biotropica, 33,1:207-211.
Meyers, 2008. Identification, distribution and control of an invasive pest ant, Paratrechina sp. (Hymenoptera: Formicidae). Doctoral Thesis. Texas Austin University.
Peacock et al. 1950. The Biology and Control of the Ant Fest *Monomorium pharaonis* (L). Misc. Publ. Dep. Agric. Scat. 17, VI: 7-51, Abstract.
Ripa & Larral, 2008. Manejo de plagas en paltos y cítricos Institute de Investigaciones Agropecuarias. Colección Libros INIA N° 23 [with English language translation].
Sanders et al. 1992. Food acceptability and distribution in the colony of the bigheaded ant, Pheidole megacephala (Fabr.)(Hymenoptera: Formicidae). Proc Hawaiian Entomol Soc. 31:65-72.
Stringer et al. 2011. Sampling efficacy for the red imported fire ant Solenopsis invicta (Hymenoptera: Formicidae). Environmental entomology, 40, 5: 1276-1284.
International Search Report of PCT/IB2017/051368 dated Jun. 27, 2017.

* cited by examiner

*Primary Examiner* — Robert T. Crow
*Assistant Examiner* — John P Nguyen
(74) *Attorney, Agent, or Firm* — Berenato & White, LLC

(57) ABSTRACT

The invention relates to a method to manufacture meat-based matrices and the matrices obtained thereof useful as bait for ant control. The method of the invention comprises (a) cleaning and mincing or slicing meat; (b) cooking the meat; (c) dewatering the meat; (d) grinding and sifting the meat to obtain meat particles; and (e) adding sugar and a preservative. Additionally, a nitrate source and an active ingredient can be incorporated into the matrices.

8 Claims, No Drawings

METHOD TO MANUFACTURE ANT BAIT MATRICES AND COMPOSITIONS

CROSS-REFERENCE TO RELATED APPLICATIONS AND CLAIM TO PRIORITY

This application is a national stage application of International Application No. PCT/IB2017/051368 filed Mar. 8, 2017, the disclosures of which are incorporated herein by reference and to which priority is claimed.

BACKGROUND OF THE INVENTION

1. Field of the Invention

The present invention relates to a method for the manufacturing of matrices for controlling ants with baits. The resulting matrices provide improved attractiveness and palatability by ants and find use in pest control.

2. Description of the Art

The Argentine ant (*Linepithema humile*) is a major pest in fruit orchards worldwide, primarily in US, Europe, Australia, South Africa and Latin America. This specie of ant is capable to establish a mutualistic relationship with sap sucking Homoptera insects, which can produce honeydew, the key sugar source in Argentine ant diet. Several of such Homoptera are relevant pests of cultivated plants as well. Given the fact that Argentine ants can cooperate with neighboring ant colonies and efficiently defend and protect Homoptera pests, the effectiveness of biological and chemical control methods against vermin can be reduced up to 50% (Ripa & Larral, 2008. *Manejo de plagas en paltos y cítricos*. Instituto de Investigaciones Agropecuarias. Colección Libros INIA No 23).

Some of the fruit trees affected by Argentine ants and their mutualistic pests are lemon, orange, mandarin, grape, apple, pear, apricot, plum, avocado and olives. All of them belong to fruit species grown for export, thus those pests are producing a major economic effect in agriculture and fruticulture.

Currently, in orchards the most employed pest control methods against Argentine ants are pesticide barriers applied directly onto tree trunks in order to block the transit of ants towards the foliage and fruits. These pesticides exhibit moderate toxicity in humans and are applied at concentrations 60 times higher than the foliar spray. Some examples are chlorpyrifos and diazinon. However, such pesticides have a short residual time (c.a. 40 days) on field and their application is inefficient and can only target worker ants and members outside the colony core, hence reaching a limited scope. Therefore, complementary measures as foliage pruning, weeding and multiple-time pesticide application are necessary.

Regarding urban areas, toxic residual sprays and baits—either as gels or solids—are widely used. Here, the concentration of pesticide per unit of area is lower than in the pesticide barriers for orchards. The formulation of commercial baits can comprise a sugar source (e.g. sucrose) and animal proteins (e.g. insects). Usually, the baits are contained inside specially designed devices and then, by the action of the toxic pesticide and spread of the bait through trophallaxis (mouth-to-mouth food sharing) to other colony members, including larvae and queen, extended mortality occurs in the colony members. Some examples of pesticide employed in baits are indoxacard, hydramethylon, fipronil and methoprene. Still, the costs behind this technology are relatively high and the effectiveness behind the treatment is low.

To design novel and more effective strategies against Argentine ants, the scientific literature has reported three relevant features of Argentine ants:

a) Their diet relies on sugars (honeydew provided by Homoptera) and proteins, which are scarce in nature and essential to the larvae.

b) The worker ants can distribute the foraged food to the colony, including larvae and queen by trophallaxis.

c) Strong kairomones are used to trace and forage food as well as to track the sources. The intensity of the trace depends on the quality and quantity of the food.

The very same strategies can be useful to control other relevant ant species as the red fire ants (*Solenopsis invicta*) and *Brachymyrmex* sp.

In the prior art, several matrices have included some of the features mentioned above, as the addition of animal protein to bait formulations to increase attractiveness (US20070079545 and U.S. Pat. No. 5,850,707). For example, some protein sources employed were pulp, bacon and gelatin from pork (U.S. Pat. Nos. 5,690,951; 7,045,138 and Meyers, 2008. *Identification, distribution and control of an invasive pest ant, Paratrechina sp. (Hymenoptera: Formicidae)*. Doctoral Thesis. Texas Austin University), earthworms (WO2015081390), hydrolyzed animal protein (U.S. Pat. No. 5,850,707) and fish protein from tuna, anchovies and others (CA1333561 and WO2015081390).

To improve the taste in the formulations, animal meat has also been added to baits. Some examples included sliced or ground meat from pork, poultry or cattle (Peacock et al. 1950. *The Biology and Control of the Ant Fest Monomorium pharaonis (L)*. Misc. Publ. Dep. Agric. Scat. 17, VI: 7-51; Sanders et al. 1992. *Food acceptability and distribution in the colony of the bigheaded ant, Pheidole megacephala (Fabr.) (Hymenoptera: Formicidae)*. Proc Hawaiian Entomol Soc. 31:65-72; Stringer et al. 2011. *Sampling efficacy for the red imported fire ant Solenopsis invicta (Hymenoptera: Formicidae)*. Environmental entomology, 40, 5: 1276-1284; U.S. Pat. Nos. 5,945,271; 5,273,761; 8,840,909 and Kaspari & Yanoviak, 2001. *Bait Use in Tropical Litter and Canopy Ants-Evidence of Differences in Nutrient Limitation 1*. Biotropica, 33, 1:207-211). However, most of those formulations failed to show a longer activity over time and can easily suffer of putrescence.

Although most mentioned documents employed raw or non-cooked meat, just few methods for manufacturing matrices described in the prior art have also combined cooked meat to improve stability (Kaspari M & Yanoviak, 2001. Biotropica, 33, 1:207-211). Also, in U.S. Pat. No. 5,273,761 the boiling (in a water bath) of chicken or beef bones or meat provided to be a viable technical solution.

Another and complementary strategy to reduce or avoid perishability, the methods for manufacturing matrices have also included a step of homogenous mixing with preservatives and/or antibiotics to enhance stability. For instance, in U.S. Pat. No. 5,945,271 antimicrobial agents such as propionate, potassium sorbate, streptomycin, and chlortetracycline were added to the matrix and intensively mixed using a Teflon® coated stir bar with heat.

Additionally, other disclosed preservatives that have been mixed in bait matrices are benzoic acid, sodium benzoate, salicylic acid, diphenyl, sorbic acid, dehydroacetic acid, sodium dehydroacetate, isobutyl p-oxybenzoate, isopropyl p-oxybenzoate, ethyl p-oxybenzoate, butyl p-oxybenzoate, propyl p-oxybenzoate, calcium propionate, sodium propionate, 2-methyl-4-isothiazolin-3-one, 1,2-benzisothiazolin-3-one, 1,2-Benzisothiazolin-3-one, 2-Bromo-2-nitropropane-1,3-diol or 2-Methyl-3(2H)-isothiazolone (U.S. Pat. No. 8,840,909).

New bait formulations and their manufacturing process thereof must take into account of above features as well as considering a high attractiveness at reasonable cost, longer residual activity and perishability, low environmental impact, one-time application and other relevant characteristics.

SUMMARY OF THE INVENTION

The present invention is directed to improved manufacturing method of matrices and resulting compositions for the baiting and feeding purposes of ants with enhanced attractiveness and stability. The invention also finds use to provide toxic and non-toxic matrices for ant control.

The method of manufacturing of matrices for ant control comprises cleaning, slicing and cooking of meat; followed by dewatering of the cooked meat, grinding or other method to obtain met particles. Subsequently, addition of nutrients and other components such as sugars, preservatives and optionally, a nitrate source and addition of an active ingredient. Finally, a dewatering process of the mixture.

The matrices obtained by the method of manufacturing of the invention are suitable for rearing ants, and finds particular usefulness for baiting ants as vermin control.

Optionally, the obtained matrices by the method of manufacturing of the invention are suitable as a carrier to convey to the ants a molecular marker which could affect the colony, a pathogen that infects the ants and a stain that distinguish those that fed on it so as to carry out biological and population studies.

According to the data provided below, the matrices of the invention deliver results superior to those obtained by commercial baits.

Furthermore, the method of manufacturing matrices and its resulting matrices of the invention provide a method for ant control with enhanced palatability and edibility.

Furthermore, the method of manufacturing matrices and its resulting matrices of the invention provide a method for ant control with longer residual activity and stability.

Furthermore, the method of manufacturing matrices and its resulting matrices of the invention provide an economical means for baiting.

It is an object of the invention the provision of an improved method to manufacture meat-based matrices.

An additional object of the invention is to provide matrices as bait and feeding stimulant for ants.

Another object of the invention is to provide toxic and non-toxic matrices for ant and pest control.

Another object of the invention is to provide a carrier to convey to the ants a molecular marker.

Other objects and advantages will be readily evident from the specifications and claims.

DETAILED DESCRIPTION OF THE INVENTION

The method of manufacturing of matrices for ant control of the invention is designed to generate matrices with longer perishability and enhanced attractiveness for ants. Moreover, the matrices are sufficiently attractive and long-lasting to efficiently control ant pests when used as toxic and non-toxic baits.

As used herein, the term "ant" refers to ant species of particular importance to urban environment and commercial agriculture and fruticulture either as pests or biological agents for vermin control. Ant species of relevance for this invention are Argentine ants (*Linepithema humile*), red fire ants (*Solenopsis invicta*) and *Brachymyrmex* sp., as shown in Examples 10, 11 and 14.

The method of manufacturing matrices of the invention comprises (a) cleaning and mincing or slicing of meat; (b) cooking of meat; (c) dewatering process of meat; (d) grinding and sifting of the meat to obtain meat particles; (e) addition of a sugar and a preservative. Additionally, a nitrate source and an active ingredient can be incorporated into the matrices.

The meat employed in the method of manufacturing of matrices of the invention at step (a) can preferentially be from poultry, pork, cattle, horse or combinations of them, as shown in Examples 1 to 7.

The process of cleaning and mincing or slicing of the method of manufacturing matrices of the invention at step (a) provides homogeneous meat pieces to allow efficient cooking. Here, the process of grinding or mincing of the meat to ensure homogenous cooking of the meat has not been revealed in the prior-art.

The process of the manufacturing matrices of the invention at step (b) can preferentially be a microwaving process of average intensity—to cook the meat at a temperature between 70 to 80° C.—for 60 to 80 minutes. This step can facilitate the grinding and mincing by denaturation of meat protein, in order to achieve an appropriate size and reduce the loss of meat particles on subsequent steps. Surprisingly, the heating step allows a longer useful life of the matrices, probably due the elimination of microorganisms and deactivation of enzymes involved in decomposition and putrefaction.

Other alternative heating processes at step (b) can be dry heating or boiled in water with temperature-controlled bath at 70° C. to 80° C. for 60 to 80 minutes, although the microwaving can exhibit higher matrix attractability for ants of about six to four times compared to dry heating and water bath options, respectively (as shown in Example 12). Likewise, the microwaving process can allow a shorter subsequent dewatering step, because generates a meat product with lower water content.

The processes of dewatering of meat by the method of manufacturing matrices of the invention at step (c) can preferentially be performed by forced air at 50 to 70° C. temperatures for 6 to 10 hours. Unexpectedly, the dewatering process increased the useful life in the field of the meat-based matrices. Also, this step helped to obtain non-agglomerative meat particles of proper size, which can be efficiently transported and consumed by the ants, thus directly improving the matrix attractiveness. Last, but not less important, the dewatering process allows to ensure the economic success of the manufacture method and matrices of the invention, because diminish the actual product volume and weight, thus reducing costs related to transport and storage as well as infrastructure requirements.

At step (c), a conventional oven can also be used for 12 to 16 hours at 65 to 90° C., however, this process could require three times more usage of heating compared to forced air, thus considerably increasing the energy consumption and related costs.

The process of grinding and sifting of meat of the method of manufacturing matrices of the invention at step (d) can preferentially achieve a meat particle size of 0.4 to 2.1 millimeters, suitable for transport and consumption by ants.

This particle size range is more suitable for ant consumption compared to larger sizes, because ants can consume 2 to 10 times more of the matrices.

The mixture obtained by the method of manufacturing of the invention at step (e) can preferentially be composed (as weight-to-weight ratios) of 7 parts of sugar solution and 12 parts of meat particle matter, a preservative and optionally, a nitrate source and/or active ingredient of an insecticide.

The sugar solution of the mixture obtained by the method of manufacturing of the invention at step (e) can preferentially be from the group of sucrose, glucose, fructose, or combinations of them. The ants are known to be attracted and accept the mentioned sugars (WO/2010/060817A2). Here, the addition of sugar can increase the matrix consumption by ants by 60 to 100% compared to a sugarless matrix, as shown in Example 13.

The preservative employed in the method of manufacturing of matrices of the invention at step (e) is preferentially a salt of nitrate, sorbate, benzoate, or combinations of them.

Optionally, at step (e) a nitrate source can be added to the mixture, preferentially a salt of sodium, potassium, calcium, ammonium or combinations of them. Despite the nitrate source was first incorporated to diminish perishability of the matrices, surprisingly, when the nitrate is included into the matrices, it can notably increase its attractiveness for ants, as shown below in Example 9.

Optionally, the method of manufacturing of matrices of the invention can further comprise an extra step of dewatering of the mixture obtained at step (e), which can preferentially be performed by forced air at 40 to 50° C. for 4 to 6 hours.

The combined processes of cooking and dewatering of the method of manufacturing of matrices of the invention are intended to maintain the characteristics of the meat and the obtained mixture as well as to enhance consumption and stability of bait matrices of the invention, as shown below in Example 12 where consumption occurred at least during 30 days in the field.

The active ingredient employed in the method of manufacturing of matrices of the invention—as an optional step—is preferentially from the group of hydramethylnon, sulfuramid, indoxacarb, tiametoxam, boric acid, fipronil, spinosad, deltametrin, abamectin, or combinations of them, all ingredients that are well known for its effectiveness in the prior art.

The matrices obtained by the method of manufacturing of the invention are composed of meat, a sugar, nitrate salt, a preservative, and optionally an active ingredient, all homogeneously mixed according to different weight-to-weight ratios, as shown in Examples 1 to 7.

The matrices obtained by the method of manufacturing of the invention are employed for baiting and feeding of ants, as shown in Examples 8, 9, 12 and 13.

The matrices obtained by the method of manufacturing of the invention are employed for ant control as shown in Examples 10 and 14, and additionally, to control of immature ants as shown in Example 11.

EXAMPLES

The following examples are intended only to further illustrate the invention and are not intended to limit the scope of the invention which is defined by the claims and if necessary, in view of the specifications.

Example 1

The example describes a method of manufacturing of a matrix for baiting ants in accord with this invention (as percentage of dried weight): c.a. 79.95% chicken liver, 20% sucrose, 0.05% potassium nitrate. The method proceeded by first heating chicken liver for 50 minutes at 70 to 80° C. in a microwave, followed by a dewatering process by forced air for 8 hours at 50° C. Then, the liver was grinded and sifted to reach particles of 0.7 to 1.6 millimeters in size. The particles were homogeneously mixed with a solution of sucrose, potassium nitrate and potassium sorbate. A new dewatering process was applied over the mixture by forced air at 40° C. over 8 hours. The final matrix presented 20% humidity.

Example 2

The example describes a method of manufacturing of a matrix for baiting ants (as percentage of dried weight): c.a. 100% pork pulp. The method proceeded similar to Example 1.

Example 3

The example describes a method of manufacturing of a matrix for baiting ants (as percentage of dried weight): 100% chicken thigh. The method proceeded by first cleaning, skin removal and deboning of chicken thighs, then heating for 20 minutes at 100° C. in water, followed by a dewatering process by forced air for 8 hours at 50° C. Then, the chicken thighs were grinded and sifted to reach particles of 0.7 and 1.6 millimeters in size.

Example 4

The example describes a method of manufacturing of a matrix for baiting ants (as percentage of dried weight): 100% chicken liver. The method proceeded by first cleaning of chicken liver, then heating for 20 minutes at 100° C. in water, followed by a dewatering process by forced air for 8 hours at 50° C. Then, the chicken liver was grinded and sifted to reach particles of 0.7 to 1.6 millimeters in size.

Example 5

The example describes a method of manufacturing of a matrix for baiting ants (as percentage of dried weight): 100% chicken liver. The method proceeded is similar to Example 1.

Example 6

The example describes a method of manufacturing of a matrix for baiting ants in accord with this invention (as percentage of dried weight): c.a. 79.95% chicken thigh, 20% sucrose, 0.05% potassium nitrate. The method proceeded similar to Example 1.

Example 7

The example describes a method of manufacturing of a matrix for baiting ants (as percentage of dried weight): 100% chicken liver. The method proceeded by first cleaning of chicken liver, then heating for 3 hours at 100° C. in a conventional oven, followed by a dewatering process by forced air for 8 hours at 50° C. Then, the chicken liver was grinded and sifted to reach particles of 0.7 and 1.6 millimeters in size.

Example 8

The example illustrates the attractiveness of the meat-based matrices for ants. A field trial was performed in an orchard infested by Argentine ants (*Linepithema humile*). During 24 hours, the matrices obtained in Examples 3 and 4 were offered to ants to measure the consumption. For comparison, a matrix based on ground sardine obtained by the method described in Example 3, was employed.

The matrices (4 grams each) were separately provided on small pots, which were displayed onto a circular platform placed inside a cylindrical container. A hole located on the center of such platform and container allowed the entry of ants. The trials were repeated eight times and on different days. The average results are presented in Tables 1 and 2 that demonstrate the improved attractiveness expressed as consumption of the matrices obtained by the method described in this invention compared to the standard sardine matrix.

TABLE 1

Consumption of matrixes by Argentine ant (*Linepithema humile*)

| Matrix | Consumption (g/day) | |
|---|---|---|
| | Day 1 | Day 2 |
| Example 3 | 2.77 | 0.85 |
| Example 4 | 0.86 | 0.33 |
| Sardine | 0.08 | 0.03 |

TABLE 2

Consumption of matrixes by Argentine ant (*Linepithema humile*)

| Matrix | Consumption (g/day) | | |
|---|---|---|---|
| | Day 1 | Day 2 | Day 3 |
| Example 3 | 4.2 | 2.8 | 0.4 |
| Example 2 | 1.7 | 1.1 | 0.1 |
| Example 5 | 0.08 | 0.03 | 0.1 |

Example 9

The example illustrates the enhancing effect of nitrate salts on increase of the consumption of matrices by ants.

A field trial was conducted on three different orchards of lemon trees infested by Argentine ants. Pots containing the matrices from Examples 1 and 2 with or without potassium nitrate were offered to ants to measure the consumption for 24 hours. Pots were weighted before and after to determine the actual consumption.

The average results are presented in Table 3 and demonstrate the improved consumption of the matrices when a nitrate source is incorporated as described in this invention.

TABLE 3

Consumption of matrixes by Argentine ant (*Linepithema humile*) in *Citrus* orchards.

| | Consumption (g/day) | | | | |
|---|---|---|---|---|---|
| | Example 1 | | | Example 6 | |
| Matrix | Site 1 | Site 2 | Site 3 | Site 2 | Site 3 |
| With $KNO_3$ | 0.84 | 2.11 | 2.39 | 1.36 | 1.62 |
| Without $KNO_3$ | 0.65 | 1.67 | 1.75 | 0.68 | 1.23 |

Example 10

The example illustrates the consumption and effectiveness of the matrices containing an active ingredient for ant control.

The field trial was performed in a lemon orchard infested by Argentine ants. Three treatments were assessed for ant control: (i) matrix from Example 1 supplemented with Fipronil so as to contain 0.01% of this active ingredient, (ii) a commercial gel bait containing 0.1% of Tiametoxam, and (iii) untreated, without bait. Areas of half hectare were assigned per each treatment, each allocated with 70 pots containing the corresponding matrix or bait. The actual consumption was determined by weighing of 10 pots per treatment per given day.

The results are presented in Table 4 and demonstrate the improved cumulative consumption of the matrices incorporating an active ingredient as described in this invention compared to the commercial bait.

TABLE 4

Consumption of matrixes by Argentine ant (*Linepithema humile*) in a lemon orchard.

| | Cumulative consumption (g/ha) | | | | |
|---|---|---|---|---|---|
| Matrix/Day | 3 | 5 | 7 | 15 | 30 |
| Example 1 with 0.01% Fipronil | 160.2 | 165.7 | 210 | 220.1 | 242.2 |
| Gel Bait with 0.1% Tiametoxam | 90 | * | * | * | * |

* No consumption of the bait due to hardening of the gel.

Additionally, the effectiveness of the treatments to reduce the number of ants per assigned area was evaluated by counting of transiting ants on the irrigation system and nine random tree trunks.

The results are presented in Table 5 and demonstrate the improved effectiveness of the matrices incorporating an active ingredient as described in this invention compared to the commercial bait.

TABLE 5

Effect of bait treatment on the abundance of Argentine ants in lemon orchard.

| | Ant/min (Average) | | | | |
|---|---|---|---|---|---|
| Treatment | Previous | Day 30 | Day 60 | Day 90 | Day 150 |
| Matrix Example 1 + Fipronil 0.01% | 8.27 | 2.73 | 1.63 | 4.73 | 11.2 |
| Commercial gel (Tiametoxam 0.1%) | 10.9 | 17.1 | 20.7 | 33.9 | 27.1 |
| Untreated control | 13.2 | 31.1 | 37.4 | 48.0 | 44.1 |

Example 11

The example illustrates the effectiveness of the matrices containing an active ingredient for control of ant workers and immatures compared to trunk barrier treatment.

The field trial was performed in an orange orchard infested by Argentine ants. Three treatments were assessed for ant control: (i) matrix from Example 1 supplemented with Fipronil so as to contain 0.01% of this active ingredient, (ii) a trunk barrier based on 6% of Chlorpyrifos spray, and (iii) untreated, without bait. The materials and methods and the effectiveness assessment methodology were similar as in Example 10.

The results are presented in Table 6 y 7 and demonstrate the improved effectiveness of the matrices incorporating an active ingredient over ant workers and immatures as described in this invention compared to the trunk pesticide barrier.

TABLE 6

Effect of bait treatment on the abundance of Argentine ant workers in orange orchard.

| Matrix | Abundance (ants/min) | | | |
|---|---|---|---|---|
| | Day 14 | Day 33 | Day 70 | Day 140 |
| Example 1 + 0.01% Fipronil | 2.5 | 3.2 | 4.6 | 0.4 |
| Trunk barrier 6% Chlorpyrifos | 17.8 | 11.4 | 5.2 | 4.0 |
| Untreated control | 17.3 | 16.4 | 3.5 | 13.1 |

TABLE 7

Effect of bait treatment on the abundance of immature Argentine ants in orange orchard.

| Matrix | Percentage of colonies with ant immatures | |
|---|---|---|
| | Day 33 | Day 70 |
| Example 1 + 0.01% Fipronil | 13 | 37 |
| Trunk barrier 6% Chlorpyrifos | 0 | 63 |
| Untreated control | 80 | 80 |

Example 12

The example illustrates the consumption of the matrices cooked by different heating methods.

A field trial was carried out in a citrus orchard infested by Argentine ants. For each tested matrix (Examples 4, 5 and 7), five pots containing the corresponding bait were allocated close to the colony. The consumption was monitored in five different days during winter and spring.

The results are presented in Table 8 and demonstrate the increased consumption of the matrices when the meat is cooked by a microwaving process (Example 5) compared to meat cooked by a conventional oven (Example 7) or a water bath (Example 4).

TABLE 8

Consumption of matrixes cooked by different heating methods.

| Matrix | Average consumption per day |
|---|---|
| Example 4 | 0.53 |
| Example 5 | 1.22 |
| Example 7 | 0.13 |

Example 13

The example illustrates the consumption of the matrices containing sugar compared to matrixes without sugar.

A field trial was conducted on two citrus orchards: lemon and orange, infested by Argentine ants. Eight pots containing the matrices from Examples 1 with sugar and Example 5 without sugar, were offered for 24 hours to ants to measure the consumption.

Pots were weighed before and after to determine the actual consumption.

The results are presented in Table 9 and demonstrate the increased consumption of the matrices when sugar is incorporated as described in this invention.

TABLE 9

Consumption of matrixes with and without sucrose

| Matrix | Average Consumption (g/day) | |
|---|---|---|
| | Lemon orchard | Orange orchard |
| Example 1 | 1.06 | 1.49 |
| Example 5 | 0.54 | 0.90 |

Example 14

The example illustrates the consumption of the matrices by other ant genera. The bait Matrix Example 1 plus Fipronil 0.01% was tested in a field trial on *Brachymyrmex* sp. and *Solenopsis invicta* ant colonies. Both species consumed readily the bait. After 24 hours *Brachymyrmex* sp. showed no activity of the workers compared to the untreated nests.

The results demonstrate the attractability and edibility of the matrices of this invention for the control of ants of the genera *Brachymyrmex* and *Solenopsis*.

Modifications within the scope of this invention can be made by any person ordinary skilled in the art without departing from the spirit thereof. Therefore, the invention must be defined by the scope of the appended claims as broadly as the prior art will permit, and in view of the specifications if necessary.

The invention claimed is:

1. A method for manufacturing bait matrices for ant control, comprising (a) cleaning and mincing or slicing meat; (b) cooking the meat in a microwave at temperatures between 70 to 80° C. for about 60 to 80 minutes; (c) dewatering the meat by a forced air process at about 50 to 70° C. for about 6 to 10 hours; (d) grinding and sifting the meat to obtain meat particles; and (e) adding sugar, preservatives, and at least one active ingredient of an insecticide.

2. The method of claim 1, wherein the meat comprises poultry, pork, cattle, horse or combinations thereof.

3. The method of claim 1, wherein the meat particles have a size between 0.4 and 2.1 millimeters.

4. The method of claim 1, wherein the sugar comprises sucrose, glucose, lactose, fructose, dextrose, maltose or combinations thereof.

5. The method of claim 1, wherein the preservative comprises a salt of nitrate, sorbate, benzoate, or combinations thereof.

6. The method of claim 1, wherein the method further comprises mixing with a nitrate source comprising a salt of sodium, potassium, calcium, ammonium or combinations thereof.

7. The method of claim 1, wherein the forced air process is performed at about 40 to 50° C. for about 4 to 6 hours.

8. The method of claim 1, wherein said active ingredient is preferably hydramethylnon, sulfuramid, indoxacarb, tiametoxam, boric acid, fipronil, spinosad, deltametrin, abamectin, or combinations thereof.

* * * * *